United States Patent
Williams et al.

(10) Patent No.: US 6,213,539 B1
(45) Date of Patent: Apr. 10, 2001

(54) EQUIPMENT TRANSPORTATION SYSTEM

(75) Inventors: Marty Williams, Colorado Springs; Matthew Drabczyk, Hudson, both of CO (US)

(73) Assignee: Let's Go Aero, Inc., Colorado Springs, CO (US)

( * ) Notice: Subject to any disclaimer, the term of this patent is extended or adjusted under 35 U.S.C. 154(b) by 0 days.

(21) Appl. No.: 09/336,887

(22) Filed: Jun. 18, 1999

Related U.S. Application Data

(63) Continuation-in-part of application No. 09/100,808, filed on Jun. 19, 1998.

(51) Int. Cl.⁷ .................................. B60J 7/00; B60P 7/02
(52) U.S. Cl. .................. 296/181; 296/100.06; 220/252; 220/826; 224/525; 224/526; 224/527
(58) Field of Search ................. 296/100.06, 100.08; 220/252, 826, 828, 843; 224/527, 526, 525, 524, 404

(56) References Cited

U.S. PATENT DOCUMENTS

| | | | |
|---|---|---|---|
| 1,035,245 | * 8/1912 | Sanders | 296/100.06 |
| 1,779,159 | * 10/1930 | Coe | 220/252 |
| 1,849,046 | * 3/1932 | Arndt | 226/527 |
| 1,966,022 | * 7/1934 | Summer | 224/526 |
| 2,663,392 | * 12/1953 | Miller | 220/826 |
| 2,739,729 | * 3/1956 | Jonas | 220/826 |
| 2,850,025 | * 9/1958 | Bond | 220/252 |
| 2,911,130 | * 11/1959 | Kitazono | 224/526 |
| 3,025,998 | * 3/1962 | Petersen | 220/826 |
| 3,202,332 | * 8/1965 | Walker | 224/527 |
| 3,317,076 | * 5/1967 | Enders | 220/826 |
| 3,317,097 | * 5/1967 | Giordano | 220/826 |
| 3,528,578 | * 9/1970 | Schoenberger | 224/525 |
| 3,567,063 | * 3/1971 | Kovach | 220/826 |
| 4,585,915 | * 4/1986 | Moore | 220/252 |
| 4,593,840 | * 6/1986 | Chown | 224/527 |
| 4,671,439 | * 6/1987 | Groeneweg | 224/527 |
| 4,815,638 | * 3/1989 | Hutyra | 224/525 |
| 5,038,983 | * 8/1991 | Tomososki | 224/527 |
| 5,460,304 | * 10/1995 | Porter et al. | 224/527 |
| 5,749,506 | * 5/1998 | Davies | 224/525 |
| 5,881,937 | * 3/1999 | Sadler | 224/527 |
| 6,006,973 | * 12/1999 | Belinky et al. | 224/525 |
| 6,019,266 | * 2/2000 | Johnson | 224/525 |
| 6,039,227 | * 3/2000 | Stark | 224/525 |
| 6,042,175 | * 3/2000 | Williams | 296/100.06 |

FOREIGN PATENT DOCUMENTS

| | | | |
|---|---|---|---|
| 002945274 | * 5/1981 | (DE) | 224/527 |
| 000599814 | * 1/1926 | (FR) | 224/527 |
| 000637820 | * 5/1928 | (FR) | 224/527 |
| 000679638 | * 4/1930 | (FR) | 224/527 |
| 002142587 | * 1/1985 | (GB) | 224/527 |

* cited by examiner

*Primary Examiner*—Joseph D. Pape
*Assistant Examiner*—Kiran B. Patel
(74) *Attorney, Agent, or Firm*—Glenn L. Webb

(57) ABSTRACT

A carrier system for transporting equipment, such as bicycles. The carrier of a preferred embodiment of the present invention includes a partial enclosed compartment having a substantially oval shape. Two opposing lid members are pivotally mounted on each end of the compartment. The two lid members open upward and outward to allow full access to the interior of the compartment. The two lid members then close downward and towards one another with a slight overlap to fully enclose the body to form the carrier body. In one embodiment, the axle assembly and tongue are directly mounted on the lower surface of the trailer body. Equipment mounting devices are formed or affixed directly in the interior of the trailer body. The equipment is thus able to be securely transported without danger from the elements or from unauthorized access.

3 Claims, 9 Drawing Sheets

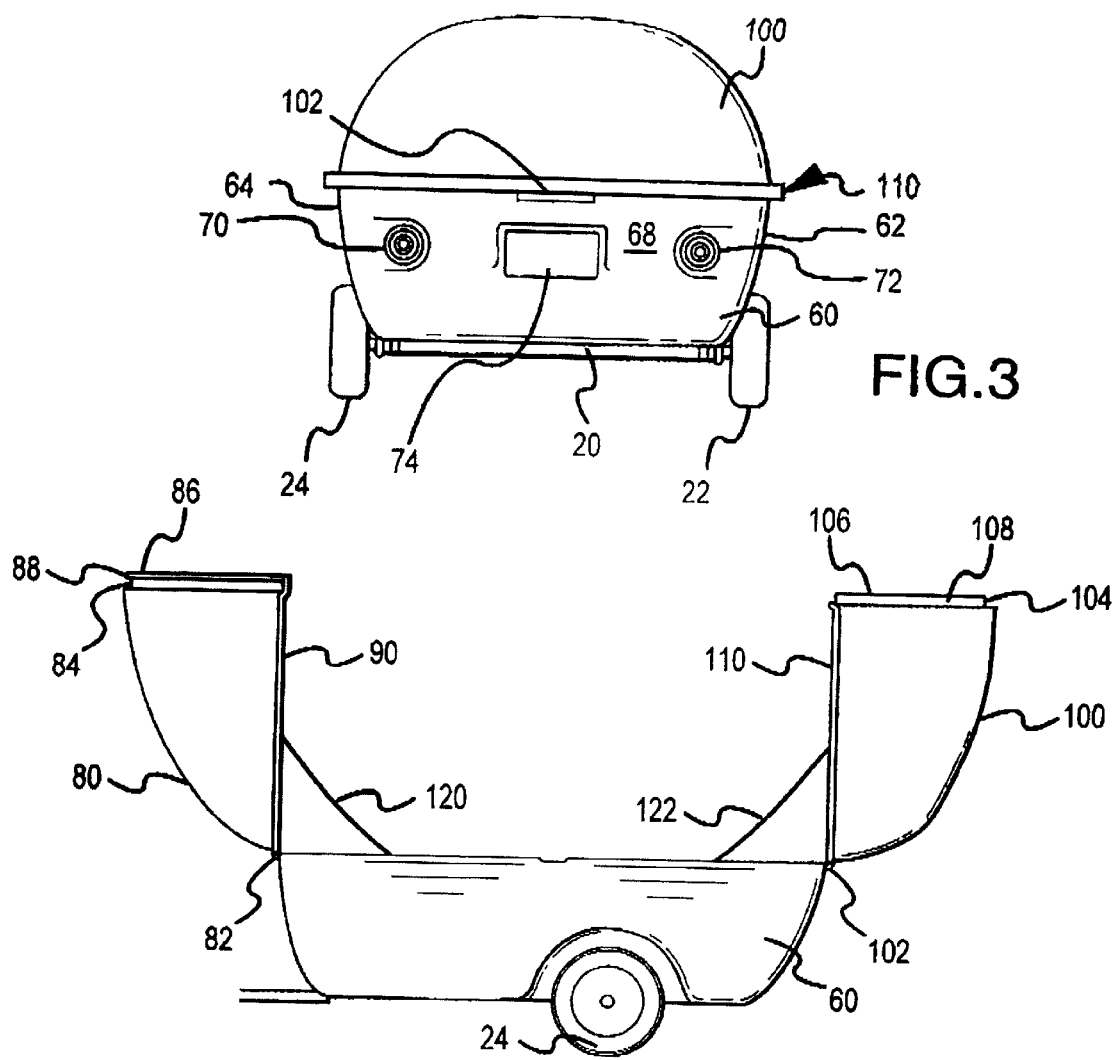
FIG.3
FIG.4
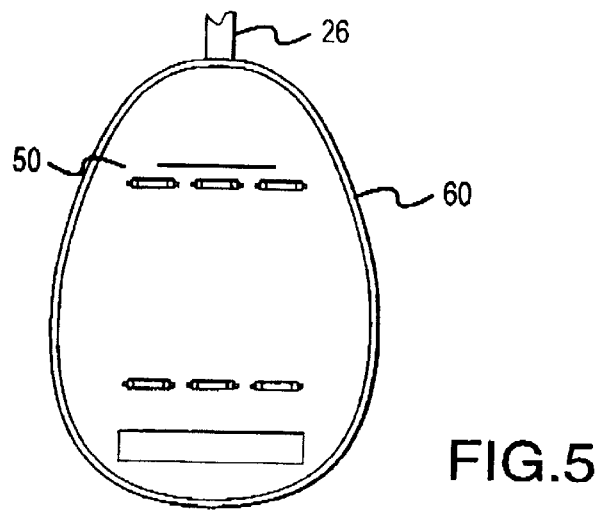
FIG.5

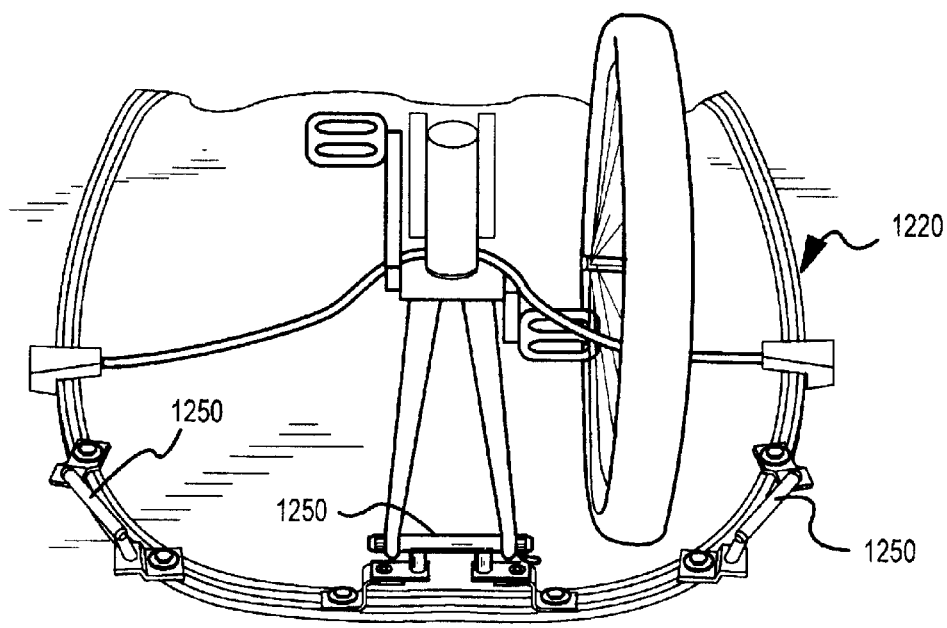
FIG.13
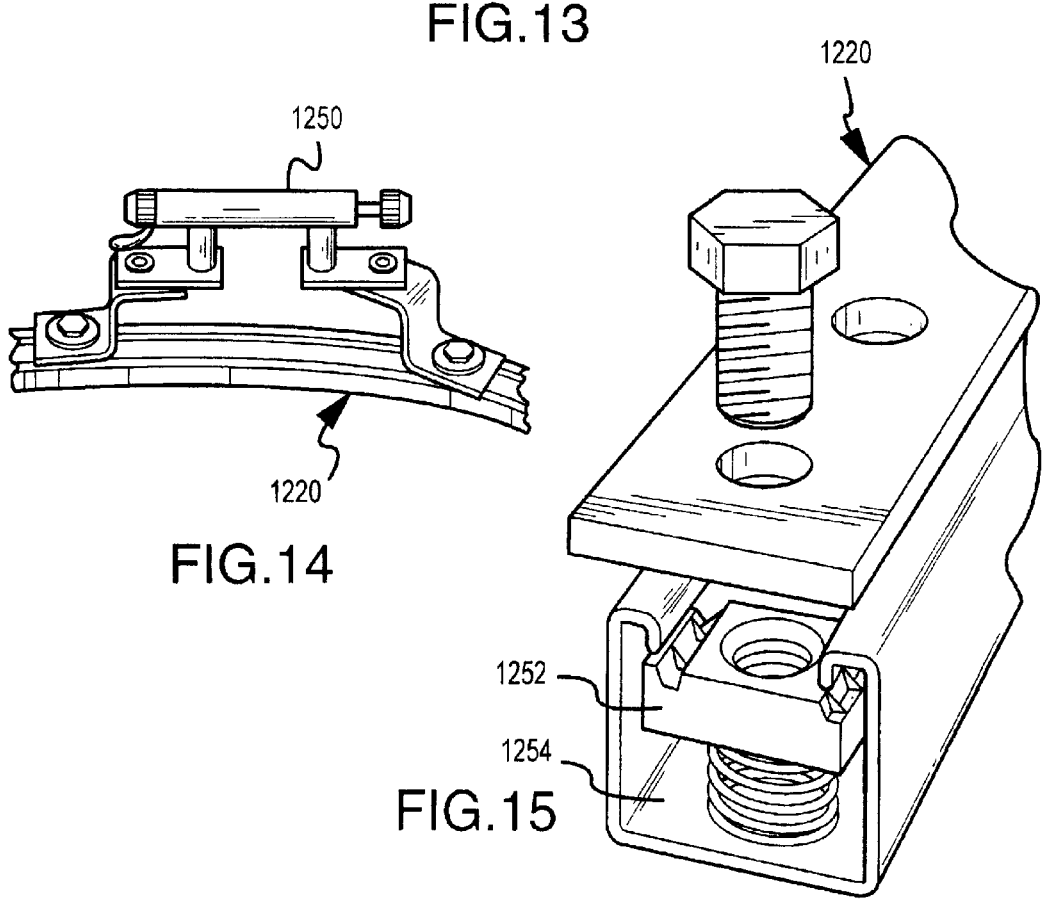
FIG.14
FIG.15

EQUIPMENT TRANSPORTATION SYSTEM

RELATED APPLICATIONS

This application is a continuation-in-part of Ser. No. 09/100,808, filed on Jun. 19, 1998.

FIELD OF THE INVENTION

This invention relates to the field of transporting equipment, and particularly, to systems for transporting sports equipment as well as other equipment.

BACKGROUND OF THE INVENTION

The use of sports equipment, as well as other recreational equipment is often hindered by the necessity of transporting the equipment to various locations. One example of this problem is the need to transport bicycles to a desired location, such as a vacation site, tour site, trail site, race, or other locations. Typically this requires either carrying the bicycle in a trunk, bed or backseat of the vehicle or else the use of a carrier of some sort, such as a car top carrier, trunk mounted carrier or receiver mounted carrier.

The use of the interior of the vehicle to transport the equipment creates a number of problems. For instance the lack of available space can be particularly a problem when there are several individuals with their associated equipment involved, especially if there is any significant distance to be traveled. Also, the view of the driver can be easily obstructed by the equipment. There is also a problem associated with damage to the equipment since the vehicle interior is seldom designed to accommodate such equipment. The security of the equipment is also an issue when the vehicle is left unattended, particularly overnight, since it is normally noticeable through the windows of the vehicle.

The use of exterior carriers also have significant problems. Exterior carriers tend to be either the modular component carriers which use racks on the vehicle top, rear or on the receiver, or else the "box-type" carriers which are essentially cargo boxes mounted on the rooftop. These carriers are cumbersome and create significant aerodynamic problems. The security of such devices are also questionable when the vehicle is left unattended. Also, the equipment is normally uncovered and susceptible to damage from the elements. Another problem with these carriers is the lack of accessibility to the equipment.

Prior trailers did not satisfactorily address these problems. The prior trailers were not designed specifically for these particular uses. The trailers tended to be boxy and relatively heavy. These trailers normally were accessible either by a rear or side door or else were open on top. Some trailers did have a removable top which tended to be cumbersome and difficult to use. The prior trailers were relatively expensive as well.

None of the prior carriers satisfactorily provided the ease of transporting equipment, the security and the convenience of storage of equipment that is desired. It is therefore desirable to provide such a device that will allow equipment, such as sports equipment as well as other recreational and work equipment, to be easily and securely transported and stored between locations.

SUMMARY OF THE INVENTION

The present invention accomplishes those needs by providing a system of carriers for transporting equipment between locations. The carriers of the present invention proves a secure and efficient device for transporting such equipment in a secure manner. The carriers of the present invention are relatively inexpensive and is formed of lightweight, high-strength materials. The carriers of the present invention are able to be towed or mounted behind most vehicles with little loss in speed or maneuverability. The present invention is aerodynamically shaped, yet is able to securely hold a large amount of equipment, such as bicycles.

The present invention does this by providing carriers having a body which is fully enclosable, yet having lid members which easily open to allow full access to the body. The compartment body is formed of a high-strength, light weight plastic material. The lower compartment body has a substantially oval shape with features pre-molded therein. For instance, the trailer hitch tongue, in one preferred embodiment, is bolted directly onto the lower compartment body. The axle assembly is also bolted directly onto the compartment body. This eliminates the need for a trailer frame and the associated weight and expense. In a preferred embodiment, an internal frame is mounted to the trailer chassis, eliminating an external trailer frame. In other embodiments, a lightweight trailer frame is used.

A first lid member is pivotally mounted on the front end of the lower compartment body with a mating second lid member pivotally mounted on the rear end of the lower compartment body. The two lid members pivot upward and away from one another to allow full access to the lower compartment body. The two lid members then pivot downward and toward one another with a slight overlap when fully closed. This fully encloses the lower compartment body as well as providing a substantial amount of additional storage as well.

In a preferred embodiment, the lids are pivotally mounted to the compartment body by a sliding hinge mechanism. This allows the lids to drop down over the ends of the compartment to reduce the height of the opened compartment lids, and to provide greater access into the compartment.

The two lid members include overlapping edges on their ends as well as their sides to seal the compartment from the outside elements as well as from unauthorized access. The two lid members can also be locked to prevent unauthorized access. The interior of the compartment body includes hardware for securing the equipment in place. For instance, bike mounting devices can be installed or even formed inside the floor of the lower compartment body. Also, cargo bins can be affixed or formed in the lower compartment body as well in the interior of the two lid members. Hooks and other devices can be installed or formed to attach other devices, such as cargo nets, and straps.

In a preferred embodiment of the present invention, an internal frame formed of a slotted channel conduit is mounted to the floor of the compartment body. This novel use of the slotted channel conduit provides two important functions. First, the internal frame is mounted through the floor of the compartment directly to the chassis to provide support to the carrier structure. Secondly, equipment mounting hardware can be mounted to the slotted channel conduit to be easily adjusted and interchanged as desired. No other carrier system has this capability.

In another embodiment of the present invention, the carrier system itself is formed from the slotted channel conduit. A frame is formed from this material in a shape that can be directly attached to a roof rack, pick-up bed, or other vehicular surface.

Other variations of the trailer can be used as well to transport other types of equipment, such as skis, luggage, kayaks as well as work equipment and tools. In other embodiments include one wheeled trailers, multiple axle trailers, or even trailers not supported by wheels but cantilevered off the rear of the vehicle. Other shapes and configurations of trailers include streamlined trailers having windspoilers, wind deflectors, or unique shapes which identify manufacturers, sports teams, sponsors for race teams, and other fanciful shapes.

One preferred embodiment of the present invention utilizes a pliable cover in place of the two lid members. The pliable cover is supported by two support rods over the opening of the compartment. A strap is used to tension the cover and to secure the cover on the compartment. A zipper or other fastening device on a side of the cover is used to allow easy access into the compartment.

Another preferred embodiment of the present invention utilizes an external frame over the compartment to provide additional securing of equipment, particularly oversize equipment such as kayaks, canoes and the like. The external frame, in a preferred embodiment, is formed from slotted channel conduit members bent to form the exterior frame. The frame is mounted to the chassis of the carrier, preferably at the mounting points of the internal frame. Equipment mounting hardware is attached to the slotted channel conduit frame.

Another preferred embodiment of the present invention is to mount the carrier compartment onto a platform. The platform includes a member which engages in the hitch receiver of a vehicle to attach the compartment onto the vehicle. The tubular member includes a telescoping section to allow the compartment to be moved rearwardly to allow access into the vehicle without removing the compartment from the vehicle. Wheeled stands are pivotally attached to the bottom of the platform to be moved into position to support the carrier when the carrier is removed from the vehicle.

These and other features of the present invention are evident from the drawings along with the detailed description of preferred embodiments.

BRIEF DESCRIPTION OF THE DRAWINGS

FIG. 3 is a rear view of the trailer of the embodiment of FIG. 1;

FIG. 4 is a side view of the trailer of the embodiment of FIG. 1 with the lid members in an open position;

FIG. 5 is a top view of the trailer of FIG. 4 viewing the interior of the trailer;

FIG. 13 is a view of the internal frame of the embodiment of FIG. 12;

FIG. 14 is a view of the equipment mounting hardware;

FIG. 15 is a cross-section view of the internal frame of FIG. 13;

DETAILED DESCRIPTION OF A PREFERRED EMBODIMENT

Referring in more detail to the drawings, as shown in FIGS. 1–6, a preferred embodiment of the present invention is described. It is to be expressly understood that this exemplary embodiment is provided for descriptive purposes only and is not meant to unduly limit the scope of the present inventive concept. Other embodiments, and variations of the carriers of the present invention are considered within the present inventive concept as set forth of the claims herein. For explanatory purposes only, the carriers of the preferred embodiments are discussed primarily for use with bicycles. It is to be expressly understood that other types of equipment are contemplated for use with the present invention as well.

First Embodiment

Figure 1:
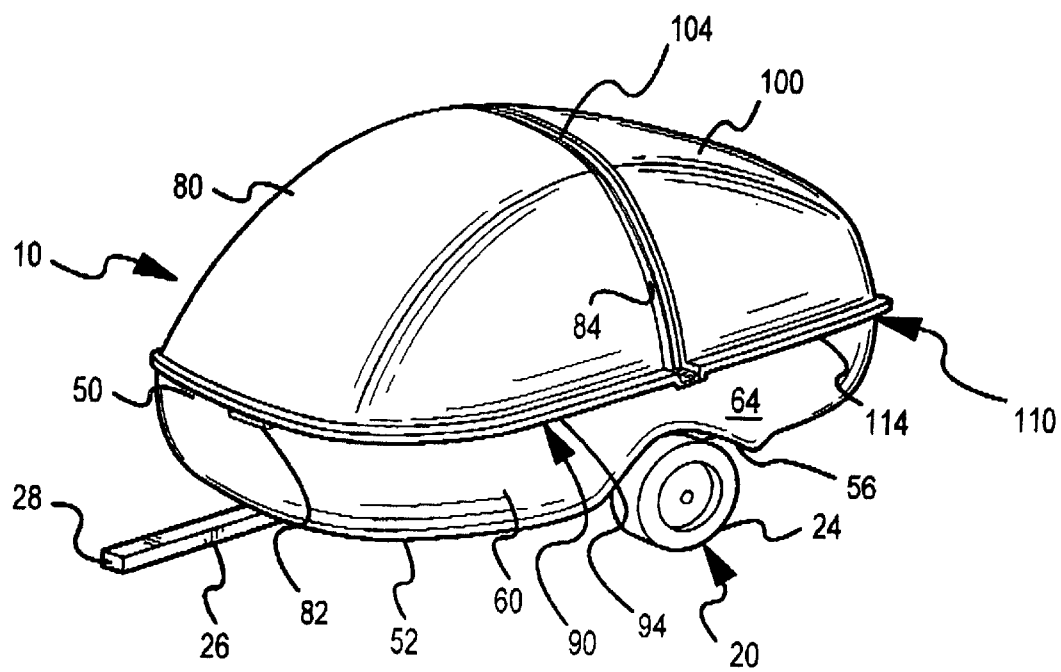
FIG. 1 is a perspective view of a preferred embodiment of a trailer of the present invention.
Figure 2:
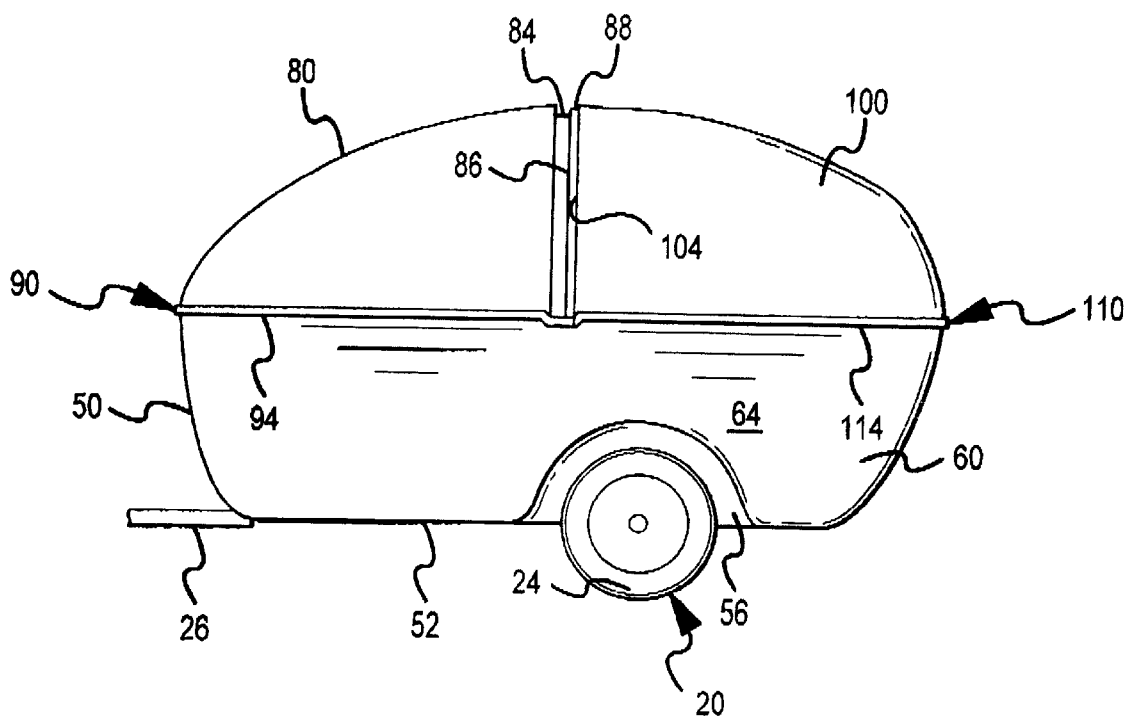
FIG. 2 is a side view of the trailer of the embodiment of FIG. 1.

Trailer 10, as shown in FIG. 1, is a preferred embodiment of the present invention. Trailer 10 includes an compartment 50 and an axle assembly 20 having wheels 22, 24 as shown in FIGS. 2 and 3. The axle assembly 20 is bolted directly onto the bottom of compartment 50, as discussed in further detail below. A tongue 26 extends outwardly from the front of the compartment 50, as shown in FIG. 1. The tongue 26, in the preferred embodiment, is bolted directly onto the bottom of the compartment 50 as discussed in greater detail below. A conventional hitch (not shown) is affixed to the front end 28 of the tongue to allow the trailer 10 to be pulled behind a vehicle. In other embodiments, the axle assembly, tongue and trailer hitch assembly are formed as a trailer frame upon which the compartment is mounted.

The compartment 50 is formed from a high-strength, durable plastic material to create a lightweight durable trailer. In the preferred embodiment, the compartment 50 is substantially oval or rounded in shape to increase the aerodynamic qualities and to decrease manufacturing expense. It is to be expressly understood that other shapes and configurations can be utilized under the present invention as well. The compartment 50 includes a lower compartment body 60. The bottom 52 of the compartment 50 includes slots and recesses for the tongue 26 and the axle assembly 20 to be bolted directly onto the compartment 50. Wheel wells 54, 56 are recessed into the side portions 62, 64 of the lower compartment body 60. Taillight recesses 70, 72, as shown in FIG. 3, are also directly formed in the rear surface 68 of the lower compartment body 60. Taillights, not shown, are then mounted within these recesses. A license plate recess 74 is also formed in the center of the rear surface 68 of the lower compartment body 60.

A first lid member 80 is pivotally attached to the lower compartment body 60 by a living hinge 82, or by a separate hinge, extending along the front of the lower compartment body 60. A second lid member 100 also is pivotally attached to the lower compartment body 60 by a living hinge 102 or by a separate hinge, extending along the rear of the lower compartment body. The first lid member 80 and the second lid member 100, when in their lowered closed position as shown in FIGS. 1–3, form a "shell" over the lower compartment body 60 to fully enclose the compartment 50.

The first lid member 80 includes a recessed end portion 84 extending about the perimeter of the rear portion 86 of the first lid member 80. The recessed end portion 84 terminates in an upturned lip 88. The second lid member 100 includes a recessed end portion 104 extending about it's rear portion 106. The recessed end portion 106 terminates in a flat lip 108. In the closed position, the recessed end portion 84 of the first lid member overlaps the recessed end portion 104 of the second lid member. This forms an effective seal as well as adding reinforcement to the compartment 50.

The first lid member 80 also includes an outwardly extending lip portion 90 extending around the perimeter of the bottom portion 92. This lip portion 90 terminates in a downwardly extending lip 94. The second lid member 100 has a similar outwardly extending lip portion 110 which terminates in a downwardly extending lip 114. These lip portions 90 and 110 form a seal over the joint between the lower compartment body 60 and the first lid member 80 and the second lid member 100 when the lid members are in the closed position. This prevents rain, snow, and other debris from entering into the compartment as well as preventing unauthorized access into the compartment.

One or more slots (not shown) are formed in the first lid member 80 in the recessed end portion 84 and/or in the outwardly extending lip portion 90. These slot(s) engage over a clasp or other locking device affixed to the recessed end portion 104 and/or in the outwardly extending lip portion 110 of the second lid member to enable the lid members to be locked together and/or onto the lower compartment body 60 to prevent unauthorized access.

The first lid member 80 and the second lid member 100 are pivotable upward, as shown in FIG. 4, about their respective hinges to allow access into the compartment 50. This opening within the center of the compartment 50 allows quick and ready access to all parts of the interior of the compartment 50 so that unloading of all the equipment contained therein is not necessary to gain access to equipment stored away from an opening as was the case in prior trailers.

Retaining cables 120, 122, or other retaining devices are used to prevent the lid members from pivoting beyond the opened position which might damage the trailer and also to enable the lid members to be easily closed without undue lifting. Also, finger holes or handles can be formed or attached to the lid members to assist in opening and closing the lid members.

Securing devices, such as bicycle skewer mounts, trays, clasps and other such devices can be hard mounted within the interior of the compartment 50, as shown in FIG. 5, to secure bicycles, or other equipment within the trailer. Also, equipment boxes, tool boxes, cargo bins, can be easily mounted or secured within the compartment as well. In one preferred embodiment of the present invention, cargo net hooks are attached to allow equipment to be safely secured within the trailer.

In use, bicycles or other equipment is stowed and secured in the lower compartment body 60 with the first lid member 80 and second lid member 100 in their up and open position. Once the equipment has been secured. The second lid member is lowered to its closed position and then the first lid member is lowered so that the recessed end portion 84 overlaps the recessed end portion 104 of the second lid member. The lid members can be then be locked to prevent unauthorized access. The lid members can then be unlocked and raised to allow access to the equipment as necessary.

When the trailer is not in use for transporting equipment, it can be easily broken down. The tongue can be unbolted, or else the hitch assembly can be released by a quick-release mechanism. The axle assembly can be unbolted, but typically would be left in place. The lightweight of the compartment and of the entire trailer allows it to be suspended out of the way for storage if desired.

The aerodynamic shape, and high-strength, lightweight structure of the trailer enables it to be easily towed behind most vehicles. However, other shapes are certainly within the scope of the present invention. For example, a lowered, windfoil or raised wind-spoiler front lid member could be used. Also, the shape of the compartment can be configured about the shape of the equipment to be transported, such as kayaks, skis, recumbent bicycles, and almost any other type of equipment. Additionally, the equipment need not be limited to sports or recreational equipment. The shape of the compartment can be configured for utilitarian purposes, such as work-sites, or about work equipment or boxes.

The sides of the compartment are particularly adaptable for the placement of decals and logos. Also, the shape of the compartment can be formed to identify product manufacturers, team sponsors, or other fanciful shapes, beyond the utilitarian shape for the equipment.

Second Embodiment

Figure 6:
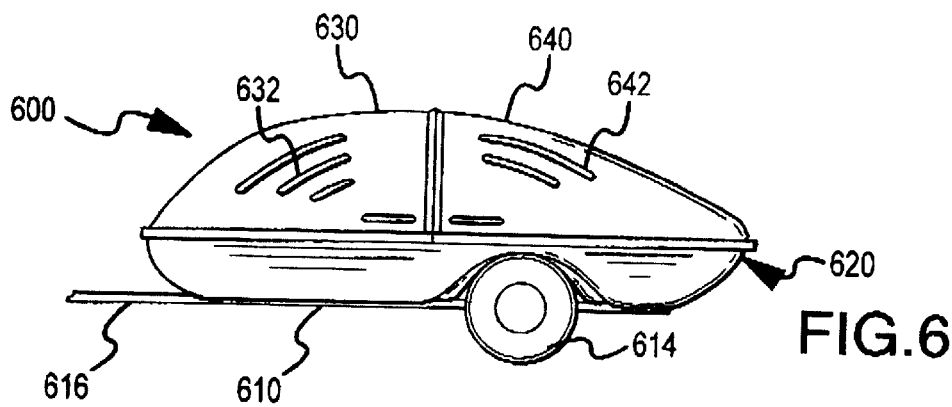
FIG. 6 is a side view of an alternative embodiment of a trailer of the present invention.
Figure 7:
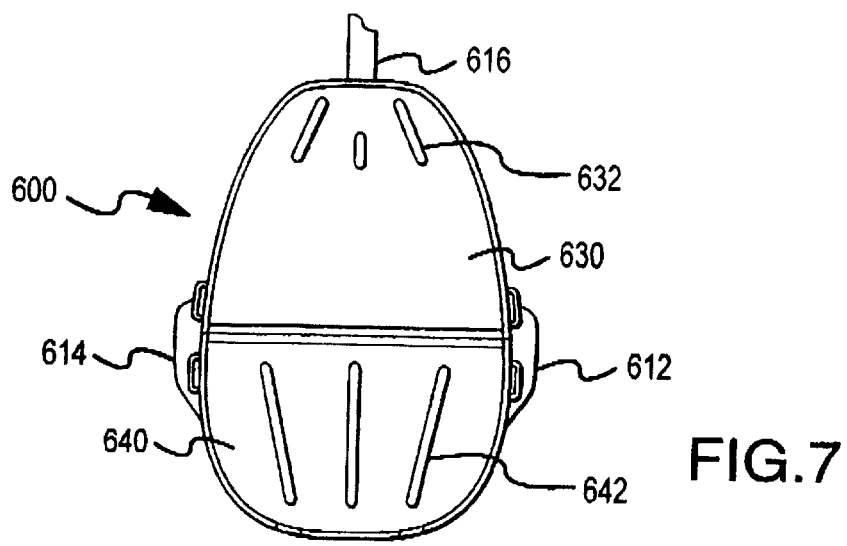
FIG. 7 is a top view of the trailer of FIG. 6.
Figure 8:
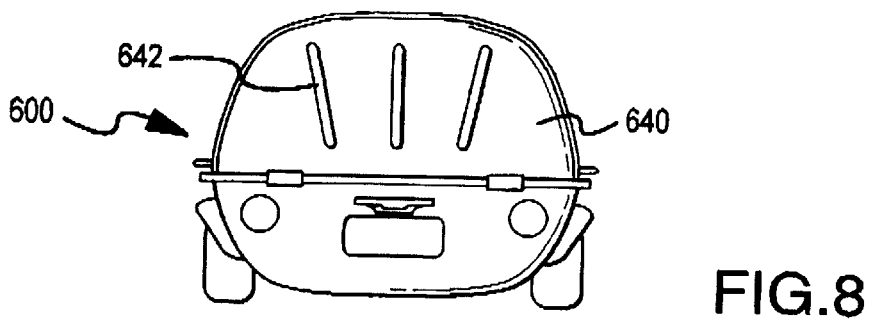
FIG. 8 is a rear view of the trailer of FIG. 6.

An alternative embodiment of the trailer of the present invention is shown in FIGS. 6–8. The trailer 600 includes a frame 610 having wheels 612, 614 mounted on an axle assembly secured to the frame. A tongue 616 extends outward from the frame 610. An compartment body 620 is mounted onto the frame 610 by well-known fasteners. The compartment body 620 extends forward on the frame 610 beyond the mid-center of the compartment body 620. This provides more weight on the tongue and vehicle to allow greater stability under heavier loads. The front lid member 630 and the rear lid member 640 are asymmetrical. The rear lid member 640 is longer with a lower profile than the front lid member 630. This provides a more streamlined appearance as well as adding additional capacity. Reinforcement ribs 632, 642 also add strength to the lid members. This embodiment has an increased payload compared to the above embodiment.

Third Embodiment

Figure 9:
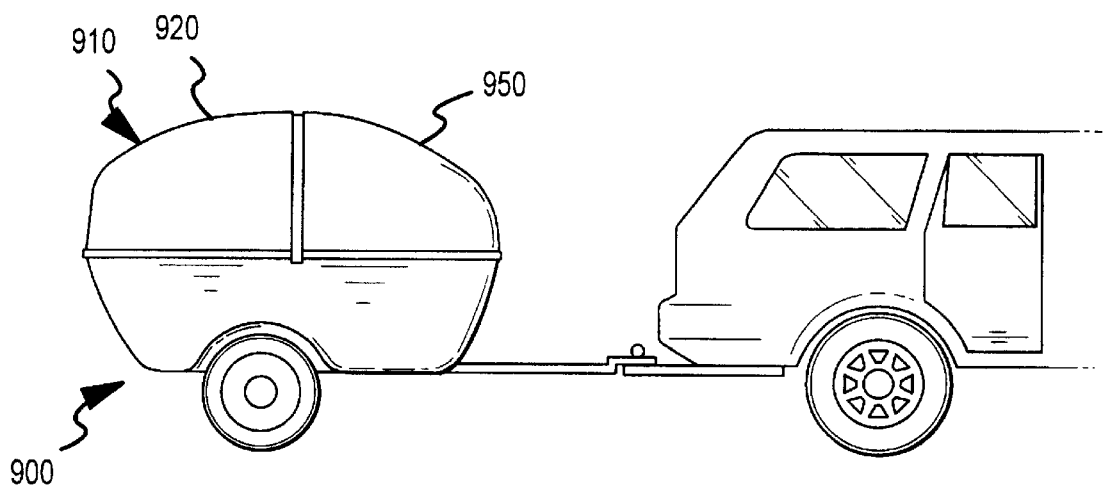
FIG. 9 is a perspective view of a third embodiment of the present invention.
Figure 10:
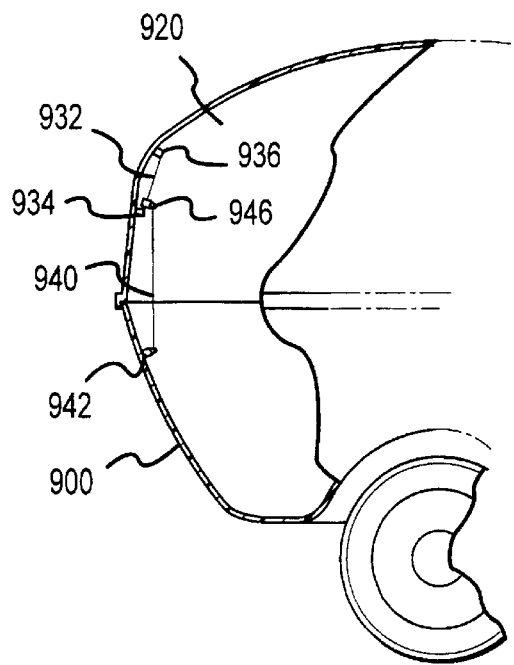
FIG. 10 is a cutaway view of the embodiment of FIG. 9.
Figure 11:
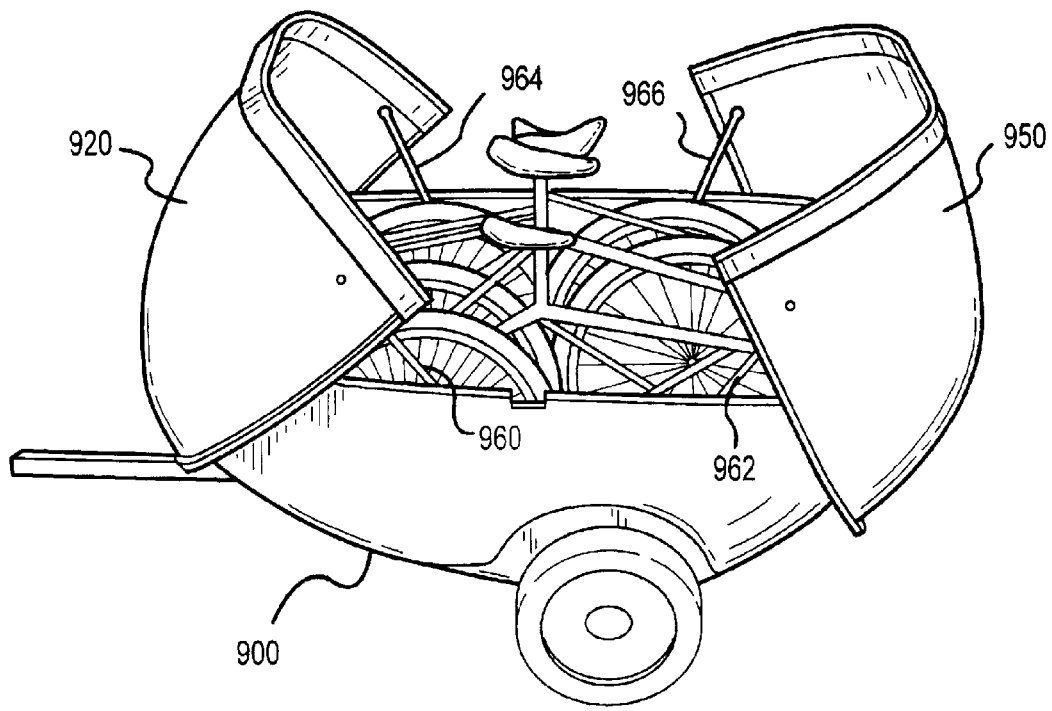
FIG. 11 is a side view of the embodiment of FIG. 9.

Another embodiment of the present invention is illustrated in FIGS. 9–11. Trailer 900 is similar to the above-described embodiment 100. Compartment 910, formed of a high strength durable plastic material. First member 920 and second member 950 are similar to the first member 80 and second member 100, described above. However, first member 920 and second member 950 are mounted in a different fashion than the first embodiment described above.

First member 920 is attached to compartment 900 by a slide and swing mechanism 930, shown in FIG. 10. Slide rod 932 is mounted to the lower interior of first member 920 by brackets 934, 936. Swing rod 940 is mounted on first end 942 to the upper interior of compartment 900. Slide bracket 946 is mounted on the second end 942 of swing rod 940. The slide bracket 946 is mounted on slide rod 932 for sliding movement. The end of first member 920 is able to slide over the end of compartment 900 and drop down, as shown in FIG. 11.

Second member 950 is attached to compartment 900 in a similar fashion, using a slide and swing mechanism. As shown in FIG. 11, first and second members are able to drop down over the ends of the compartment 900. This provides several benefits. First, the members are more stable with less stress on the members and the compartment than the hinges of the first embodiment. Second, the members are not as susceptible to wind gusts. Third, the members are not as likely to drop down during the loading or unloading process. Fourth, the opening is actually larger, since the members slide away from the center of the compartment. In an alternative embodiment, the slide and swing mechanism utilizes two swing rods to provide additional stability.

This embodiment, as shown in FIG. 11, incledes slide rods 960, 962, 964, 966 to stabilize the members 920, 950 as the members are opened upward. Slide brackets 968, 970, 972, 974 are mounted to the interior of the compartment 900 for the slide rods to move through.

The slide brackets 968–974 and the slide and swing mechanisms are designed to allow the slide rods and swing rods to easily disengaged. This is done by using spring clips, set screws or other attachment devices. Thus, the trailer can be easily assembled for use and disassembled when not in use.

Fourth Embodiment

Figure 12:
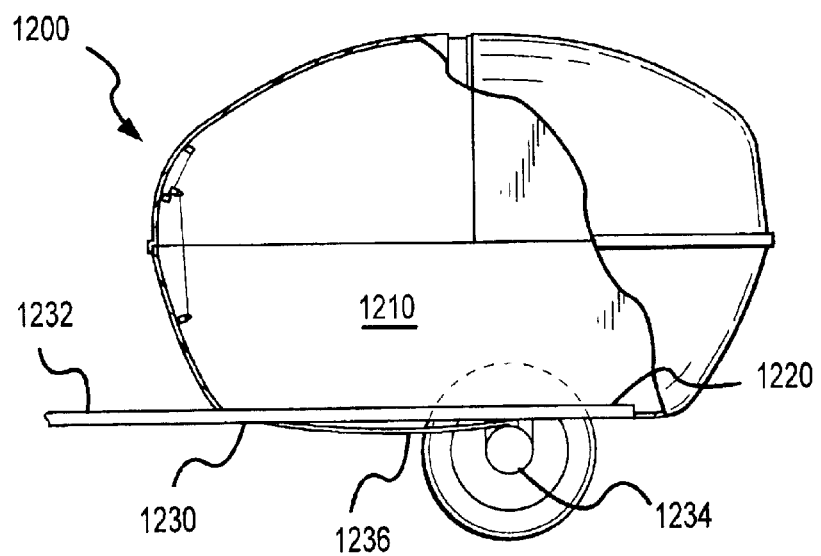
FIG. 12 is a top view of a fourth embodiment of the present invention.

The present invention also provides a unique feature which simultaneously forms the infrastructure of the trailer and provides adjustable hard point mounting for the equipment in the trailer. Trailer 1200, shown in FIG. 12, includes internal frame 1220 mounted on the floor of the compartment 1210. Internal frame 1220 is directly mounted to the chassis 1230 of the trailer 1200 through the floor of the compartment. In this embodiment, the chassis 1230 of the trailer consists of tongue 1232, axle 1234 and torflex suspension 1236. The chassis does not include a frame in this embodiment. The internal frame 1220 provides the frame for the trailer.

The internal frame 1220, in one embodiment, includes several points for attaching hardware for securing equipment in the trailer. For example, well-known bicycle securing hardware could be attached for securing bicycle frames within the trailer. Other hardware could be used as well, such as loops or hooks for bungee cords or cargo networks.

In a preferred embodiment, the internal frame 1220 is formed from open-slotted channel conduit, such as the slotted conduit provided by Unistrut Corporation. This slotted conduit is used for industrial and commercial applications to provide construction framework as well as electrical cable routing. The present invention provides a unique application for this material. As shown in FIG. 13, the internal frame 1220 utilizes this slotted channel conduit bent into a substantially oval shape and mounted on the floor of the compartment directly to the trailer chassis. Bicycle mounting hardware 1250 is adjustably mounted to the internal frame by spring nuts 1252, shown in FIGS. 14 and 15. The spring nuts 1252 are able to slide within the channel 1254 of the internal frame 1220 to the desired spot in the compartment. Thus, the equipment mounting hardware can be quickly interchanged and moved as desired.

Figure 16:
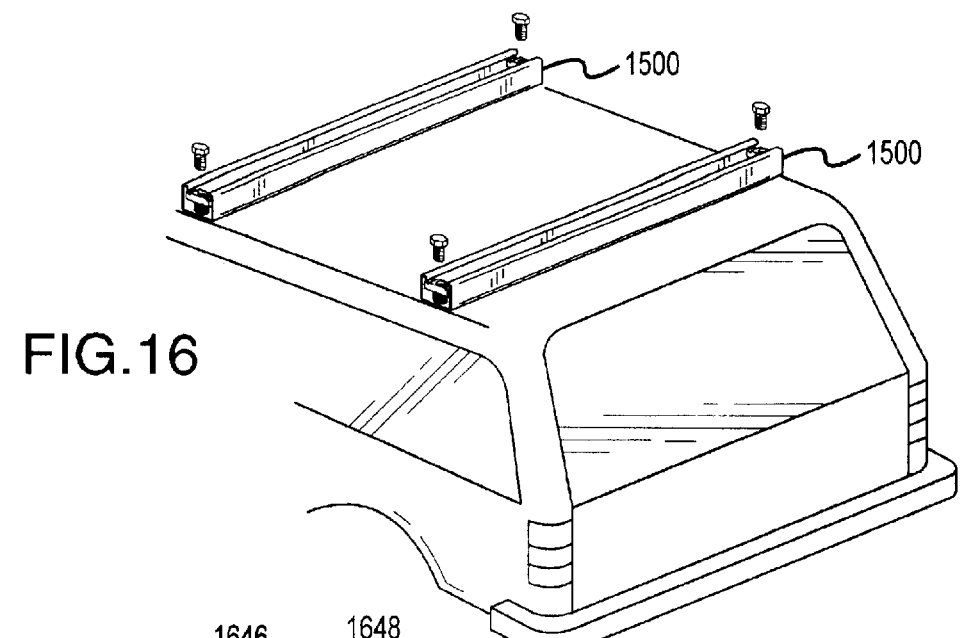
FIG. 16 is a view of roof-top carrier version of carrier.

The present invention also includes other embodiments for equipment transportation utilizing the slotted framing conduit. For instance, the slotted framing conduit may be utilized on a roof-top carrier 1500, as shown in FIG. 16, in lieu of the bars currently widely in use. Appropriate equipment mounting hardware can be easily and adjustable mounted to the slotted framing conduit by spring nuts in place of the C-clamps and blots current used.

Fifth Embodiment

Figure 17:
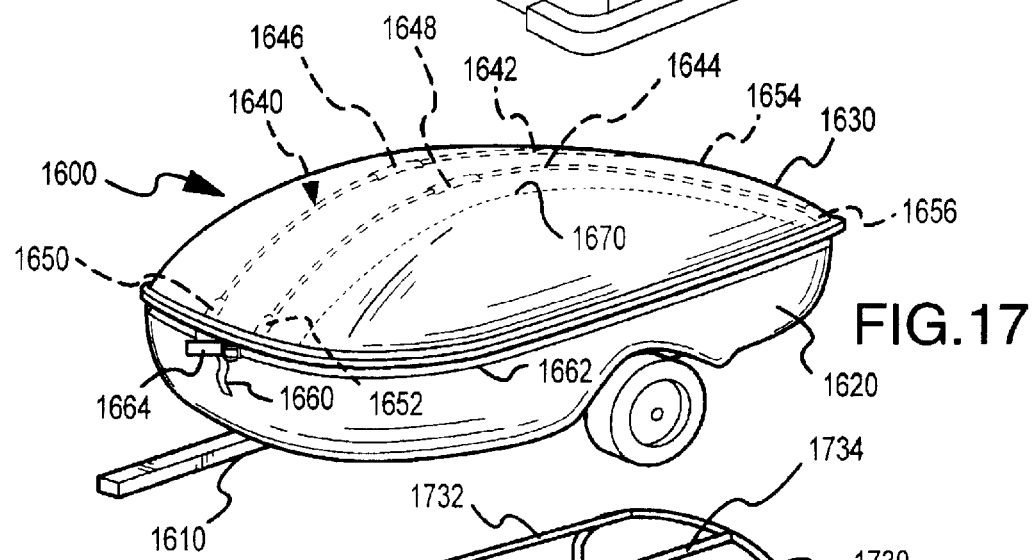
FIG. 17 is a perspective view of fifth embodiment of the present invention.

An alternative embodiment of the present invention is illustrated in FIG. 17. Trailer 1600 includes trailer chassis 1610 and compartment 1620, similar to the trailer chassis and compartments described above. Soft top 1630 is utilized instead of the members of the above-described embodiments. Soft top 1630 is formed of a durable material such as canvas, nylon or other flexible cover material. The soft top 1630 is supported on the compartment by internal frame 1640. Internal frame 1640 includes aluminum rod 1642 and aluminum rod 1644 extending through pockets 1646, 1648, respectively, formed on soft top 1630. The ends of aluminum rods 1642, 1644 fit into pockets 1650, 1652, 1654, 1656 in the edges of the soft top 1630.

Strap 1660 is mounted within pocket 1662 on the perimeter of the soft top. Strap 1660 is preferably formed of a durable elastic material. Tensioning device 1664 secures the ends of strap 1660. Soft top 1630 is placed on the compartment 1620 so that strap 1660 extends beneath the upper rim of the compartment. The strap is tightened by the tensioning device 1664 until the soft top 1630 is taut over the compartment. Other tensioning devices can be used, such as snaps, as well. The support rods 1642, 1644 provide support for the soft top as well keeping the soft top raised from accumulating water, snow or other debris.

Zipper 1670 is provided to allow easy access to the interior of the trailer without removing the soft top. If necessary, the tension in the soft top can be lessened to allow ease of use of the zipper.

Sixth Embodiment

Figure 18:
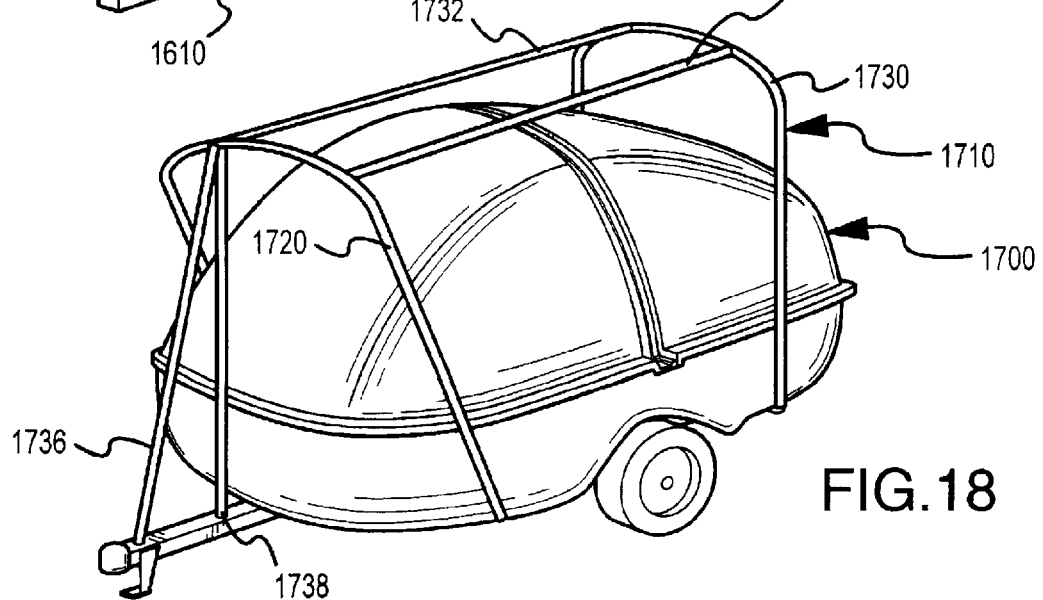
FIG. 18 is a perspective view of a sixth embodiment of the present invention.
Figure 19:
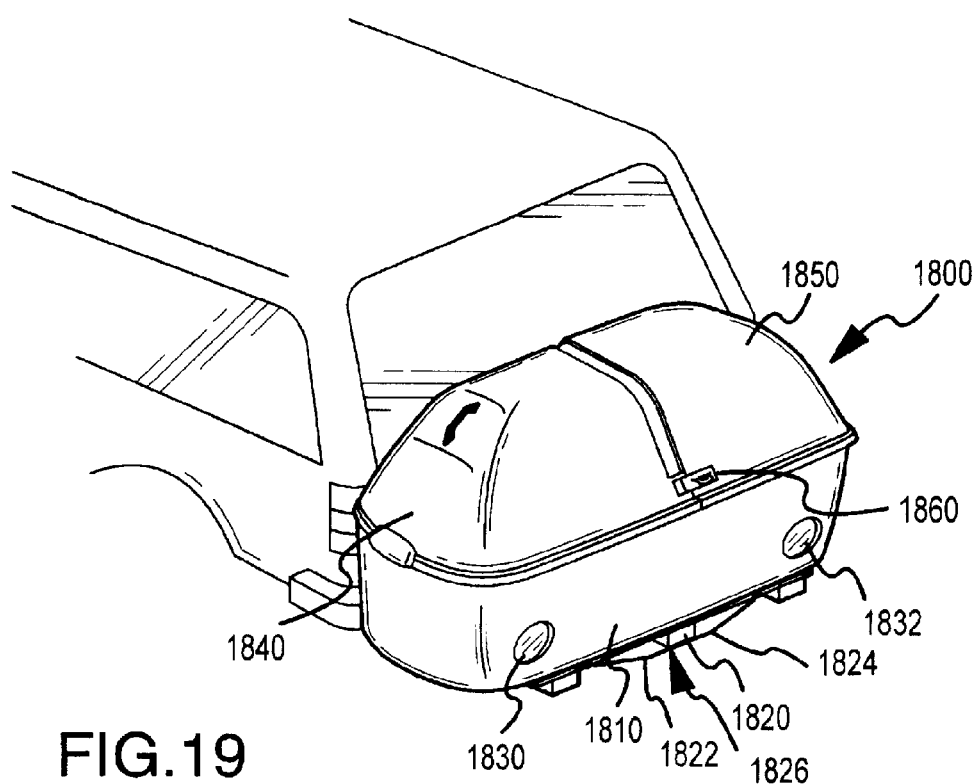
FIG. 19 is a perspective view of a seventh embodiment of the present invention.
Figure 20:
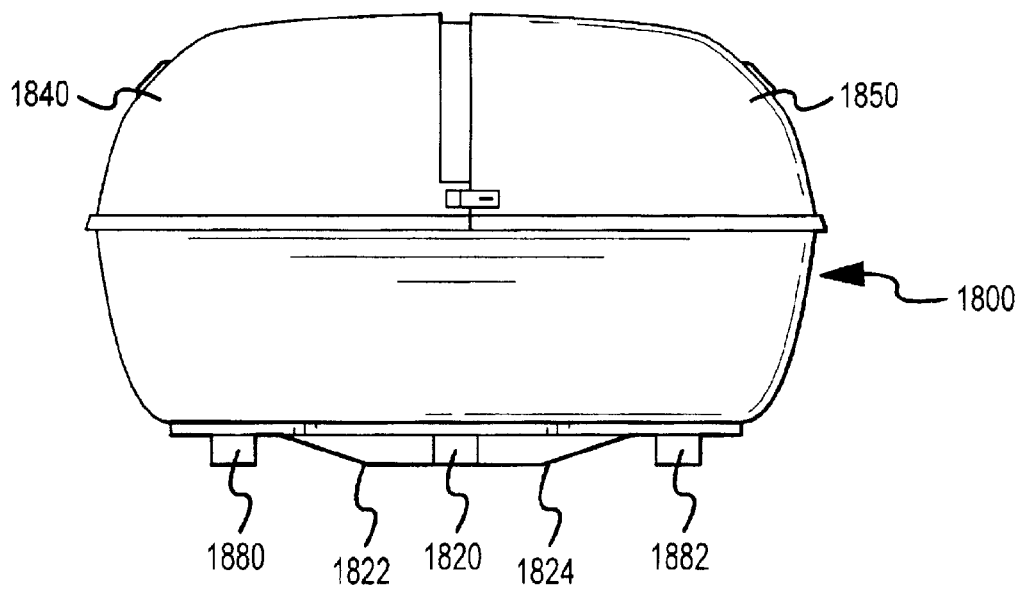
FIG. 20 is a rear view of the embodiment of FIG. 19.

Another embodiment of the present invention is illustrated in FIG. 18. External frame 1710 is mounted to trailer 1700. External frame 1710 includes front frame section 1720, rear frame section 1730, cross frame members 1732, 1734 extending between the front frame section 1720 and rear frame section 1730, and support members 1736, 1738 securing front frame section 1720 to the tongue of the trailer.

In the preferred embodiment, the front frame member 1720 attaches to the trailer at the mounting points of the internal frame member 1220 discussed above, and the trailer chassis. The rear frame section 1730 also attaches directly to the trailer at the rear mounting points of the internal frame member 1220 and the trailer chassis.

Equipment mounting hardware can be mounted on the front frame member 1720, the rear frame member 1730 and/or the cross frame members 1732, 1734. Thus, additional equipment, such as kayaks, canoes, hang gliders, or other equipment which may be unable to fit within the trailer can be transported.

In a preferred embodiment, the frame members are formed from the slotted framing conduit discussed above, such as the conduit manufactured by the Unistrut Corporation. The equipment mounting hardware can be easily mounted onto the frame members by spring nuts. The hardware can be easily adjusted or interchanged as well.

Seventh Embodiment

Another embodiment of the present invention is illustrated in FIGS. 19–22. The equipment transportation system of this embodiment mounts directly onto the trailer hitch receiver of a vehicle. Compartment 1800 includes a lower compartment 1810 mounted on tubular member 1820. Support brackets 1822, 1824 provides support for the base of lower compartment 1810 on tubular member 1820. Platform 1826 may also be used to support lower compartment 1810 as well. Recessed taillights 1830, 1832 are mounted on the exterior of lower compartment 1810.

Figure 21:
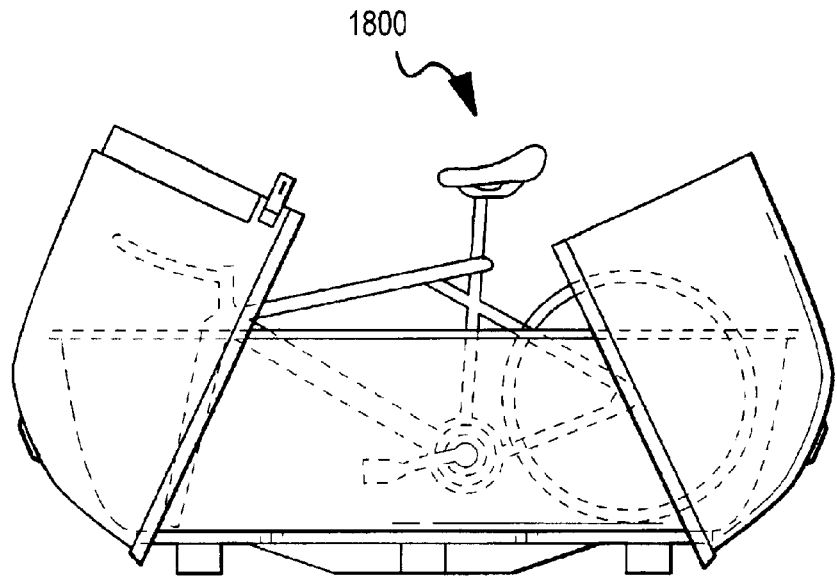
FIG. 21 is a view of the embodiment of FIG. 19 in an open position.
Figure 22:
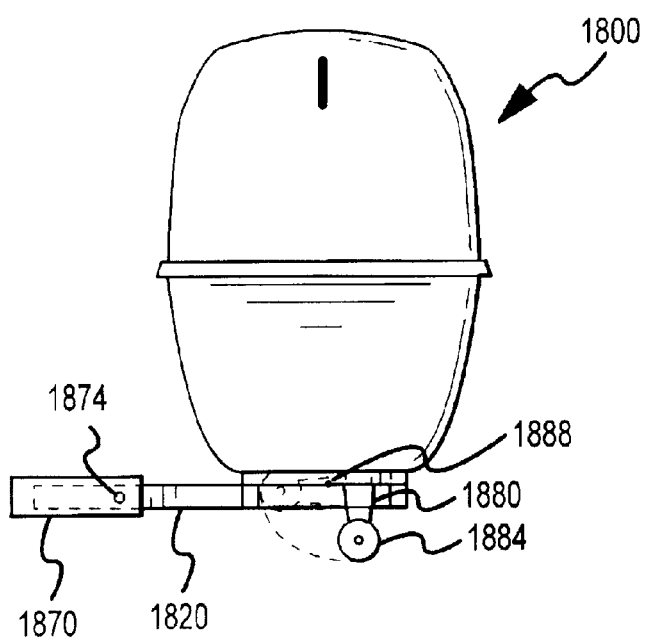
FIG. 22 is a side view of the embodiment of FIG. 19.

Compartment 1800 also includes first member 1840 and second member 1850. First member 1840 and second member 1850 are mounted to compartment by slide and swing mechanisms, such as the slide and swing mechanism 930 discussed above. This allows the members to slide over the lower compartment 1810 and drop down to be out of the way, as shown in FIG. 21. The members include a recess lip to allow the members to overlap for sealing purposes. A locking latch member 1860 is also used to securely lock the members.

Compartment 1800 is mounted to the vehicle by sliding tubular member 1820 into the hitch receiver of the vehicle. A pin is then inserted through the hitch receiver and the tubular member 1820 to secure the compartment to the vehicle.

In the preferred embodiment, the tubular member 1820 includes a telescoping section 1870 which is normally inserted over tubular member 1820. If access is desired into the rear of the vehicle, pin 1874 is removed and tubular member 1820 is slid rearward relative to telescoping section 1870 a sufficient distance to allow the rear tailgate to be lowered. Once the tailgate is closed, the compartment 1800 is slid towards the vehicle until the pin 1874 can be reinserted.

Another feature of the preferred embodiment are flip down legs 1880, 1882 mounted on lower side of the base of the compartment. Wheels 1884, 1886 are attached to bottom of legs 1880, 1882. Pins 1888, 1890 hold the flip down legs against the base of the compartment. The pins are removed to release the legs when the compartment is to be removed from the vehicle. Once the legs are fully lowered and the wheels engage the ground, the legs are locked in place. The pin is removed from the hitch receiver and the compartment can simply be rolled away from the vehicle.

Other embodiments

The present invention also includes embodiments having only wheel, or with multiple axles to allow four or more wheels, depending on the use of the trailer. Also, in another embodiment, the trailer is directly mounted to the bumper of the vehicle. In another embodiment, the trailer is fully supported by the bumper of the vehicle and does not use wheels. In yet another embodiment, one or more accesses can be formed in the front, rear, sides or in the lid members of the compartment to allow easy access to equipment or tools stored within the compartment.

Other embodiments contemplated under the present invention includes mounting a compartment on skis, runners, skids, pontoons, foils or other apparatus for use on snow or water.

The present inventive concept, as set forth in the accompanying claims, covers not only the described embodiments but other embodiments, variations and configurations of the trailer as stated in the accompanying claims.

We claim:

1. A carrier for transporting equipment, said carrier comprising:

an compartment having a partially enclosed body and an upper edge;

an attachment mechanism for attaching said compartment to an external portion of a vehicle;

a first lid member;

means for pivotally mounting said first lid member to a first end of said partially enclosed body to allow said first lid member to move from a closed position to an open position wherein a substantial portion of said first lid member extends partially below said upper edge of said compartment in said open position;

a second lid member;

means for pivotally mounting said second lid member to a second end of said partially enclosed body to allow said second lid member to move from a closed position to an open position wherein a substantial portion of said second lid member extends partially below said upper edge of said compartment in said open position; and wherein said first lid member and said second lid member fully enclose said compartment in their respective closed positions and allow access to said compartment in their respective open positions.

2. The carrier of claim 1 wherein said carrier includes:

means on said carrier for stabilizing said first lid member as said first lid member is opened; and means on said carrier for stabilizing said second lid member as said second lid member is opened.

3. The carrier of claim 1 wherein said carrier includes:

a chassis for supporting said compartment.

* * * * *